United States Patent
Kawaguchi

(10) Patent No.: US 6,631,861 B1
(45) Date of Patent: Oct. 14, 2003

(54) GRINDING DEVICE FOR RESIN COMPOSITION

(75) Inventor: Tatsumi Kawaguchi, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 10/069,230
(22) PCT Filed: Jun. 23, 2000
(86) PCT No.: PCT/JP00/04134
§ 371 (c)(1),
(2), (4) Date: Feb. 22, 2002
(87) PCT Pub. No.: WO01/98046
PCT Pub. Date: Dec. 27, 2001

(51) Int. Cl.[7] ............................................. B02C 19/12
(52) U.S. Cl. ............................ 241/65; 241/91; 241/275
(58) Field of Search ............................... 241/5, 23, 65, 241/86.1, 91, 275

(56) References Cited

U.S. PATENT DOCUMENTS 3,700,177 A * 10/1972 Pearson
3,979,073 A * 9/1976 Leliaert

FOREIGN PATENT DOCUMENTS

| JP | 50-121529 A | | 9/1975 |
| JP | 50-121530 A | | 9/1975 |
| JP | 59-203448 A | | 11/1984 |
| JP | 5-31719 | * | 2/1993 |
| JP | 8-218643 A | | 8/1996 |
| JP | 8-294916 A | | 11/1996 |
| JP | 10-32581 A | | 2/1998 |
| JP | 10-32582 A | | 2/1998 |
| JP | 10-32583 A | | 2/1998 |
| JP | 11-309713 A | | 11/1999 |

* cited by examiner

Primary Examiner—Mark Rosenbaum
(74) Attorney, Agent, or Firm—Smith, Gambrell & Russell, LLP

(57) ABSTRACT

In a rotor 1 provided with a cylinder 2 which can supply a molten and mixed resin composition to an upper portion of the rotor 1 from an opening portion and is formed by a magnetic material on an outer periphery thereof or is formed by a nonmagnetic material being contact with a magnetic material 3, the resin composition is granulated into powders or in a fiber shape by heating the magnetic material portion so as to pass the resin composition through small holes in the uniformly heated cylinder 2 due to a centrifugal force, and the granulated powders are transferred by an air feeding apparatus 12 having a rotary blade 11 mounted therein from a discharge port in a lower portion of an outer tank 8. Accordingly, since the resin composition is pulverized into the powders having a particle diameter closer to a particle diameter of a final product at a time of being collected in a product recovery container 13 than a particle diameter of the powders immediately after being granulated, a cooling operation is promoted and it is possible to reduce a pulverizing time and reduce fine powders and coarse powders generated at a time of a pulverizing step without deteriorating a characteristic of the resin. Therefore, it is possible to achieve a granulating apparatus of a resin composition which can reduce a classifying step or save labor and time.

4 Claims, 3 Drawing Sheets

GRINDING DEVICE FOR RESIN COMPOSITION

TECHNICAL FIELD OF THE INVENTION

The present invention relates to a granulating apparatus of a resin composition, and more particularly to a granulating apparatus of a resin composition which has a reduced amount of fine powders generated at a time of a pulverizing step and can reduces a pulverizing time.

TECHNICAL BACKGROUND OF THE INVENTION

For example, an epoxy resin powder coating material is generally produced in accordance with a dry process by melting and mixing respective raw materials and cooling and pulverizing the raw materials. A cooling belt is mainly used for cooling. In the case that the molten and mixed composition is insufficiently cooled, a pulverizing efficiency is reduced, and further in some cases, a target particle diameter can not be obtained. A pulverizer, a victory mill, a ball mill, a jet mill and the like are employed for pulverization, and these are selectively employed in accordance with a nature of the powder and a target particle diameter. In general, in order to increase the pulverizing efficiency, the pulverization is separately performed in a coarse pulverizing step of pulverizing to a size of 5 to 15 mm and a pulverizing step of pulverizing to a target particle diameter.

In general, since the closer to a target particle diameter after a pulverization a particle diameter of a coarse pulverized material is, the shorter a time required for pulverization is, and the narrower a particle size distribution is, the more a generation of a pulverized powder due to an excessive pulverization can be restricted. However, in the case of using a pulverizer such as a hammer mill or the like, an average particle diameter becomes large in 2 to 5 mm, and a particle size distribution becomes wide in some $\mu$m to ten and some mm. A pulverizing time is increased in the case of pulverizing the coarse pulverized material, and a lot of fine powders and coarse powders are generated. In order to improve a yield, it is necessary to again pulverize the fine powders and the coarse powders after recovery and treatment, and this causes an increase of processing cost. That is, since a lot of fine powders and coarse powders are generated in the case that the particle size before the pulverization is coarser than the target particle size distribution and the particle size distribution is wide, a pulverizing efficiency is reduced and a cost becomes high. In particular, the generation of the fine powders involves a deterioration of an operation environment.

A producing method with respect to an improvement of a pulverizing efficiency is disclosed in Japanese Patent Unexamined Publication Nos. 8-218643 and 8-294916. By employing this method, it is possible to reduce an amount of generated fine powders more than the conventional fine pulverizing step using the coarse pulverizing step such as a hammer mill or the like. However, in the case of supplying the molten and mixed resin with using no heating means as in this method, the resin is cooled and becomes a high viscosity during the granulating operation in some nature of the resin, so that a clogging is generated, whereby not only a deterioration of characteristic is generated but also a size of an obtained product is uneven and larger than the target particle diameter even in the case of being granulated. For example, in the case of a pin type disc, when the supplied resin has a low melting viscosity and is continuously supplied to a rotor linearly, the resin is extended between two adjacent pins due to a centrifugal force so as to become a fiber shape, so that a length of the fiber becomes longer than a distance between the pins.

In the case of reducing the distance between the pins in order to reduce the length of the fiber, since an amount of resin between the pins is reduced, an applied centrifugal force is reduced, and the resin is hard to be moved apart from the portion between the pins and stays within the rotor. In order to increase the centrifugal force for preventing the resin from staying, it is necessary to increase a rotational speed, a great power is required and a safety of operation is reduced. On the contrary, since a thickness of the fiber is dependent upon a supply amount of resin, the fiber becomes thin when the supply amount is sufficiently small, however, a diameter of the fiber becomes thick in the case of increasing the supply amount for increasing a production capacity, so that the granulating operation can not be stably obtained.

Further, in the case that the melting viscosity of the supplied resin composition is high and the resin is discontinuously supplied to the rotor since the resin can not be continuously supplied linearly, the resin is supplied to a local pin. Accordingly, the resin is excessively supplied in a local manner and the resin is extruded from a whole of a hollow portion of the pin, the resin forms an uneven shape and a significantly large shape. This can be applied to a vane type disc in the same manner. That is, this method is insufficient to stably obtain the granulating operation which can reduce the pulverizing time.

Conventionally, as a producing method utilizing a rotor, there are listed up Japanese Patent Unexamined Publication Nos. 50-121529, 50-121530, 59-203448 and the like, however, all of them aim to produce a cotton-like product and are different from the present invention.

Further, as a structure of aiming to provide a granulating apparatus of a pulverized coating material, there are listed up Japanese Patent Unexamined Publication Nos. 10-032581, 10-032582 and 10-032583, however, in these manufacturing methods, a container for collecting the granulated powder is structured such that an outer tank is arranged in a vertical direction to a flying direction of granulated powders or a fiber-like resin composition. In this case, since a wall surface receives an impact energy corresponding to a velocity energy of the granulated powders without being reduced, the granulated powders are easily attached to the wall surface. Since a wind stream generated by a rotation of the rotor is applied in a direction of pressing the granulated powders to the wall surface, the granulated powders are easily stayed near the wall surface. Further, since the flying speed of the granulated powders is sufficiently large, a reflecting direction after colliding with the wall surface is substantially the same as an incident direction. Accordingly, a collision with the granulated powders later flying is performed at a high probability, and since the granulated powders are molten and attached to each other, a heat capacity is increased and the granulated powders are easily attached to the wall surface. Once the granulated powders are attached to the wall surface, the granulated powders are further molten and attached to each other on the basis of those granulated powders, so that the granulated powders are hard to be cooled, thereby promoting a deterioration due to a heat.

As a structure of aiming to provide a granulating apparatus of a resin composition for solving the problems mentioned above, there is listed up Japanese Patent Unexamined Publication No. 11-309713. However, there is a case that the granulated powders immediately collected within an outer tank or in a container from the outer tank are cooled at a time of flying in an outer peripheral portion but keep heat in an inner portion. Then, there is a case that the granulated powders are molten and attached to each other and a characteristic is deteriorated in the case of accumulating the granulated powders mentioned above.

An object of the present invention is to provide a granulating apparatus of a pulverized coating material which can reduce a pulverizing time by stably obtaining granulated powders having a particle diameter closer to a target product particle diameter with generating no deterioration of a characteristic, and can reduce a number of classifying steps and save labor and time by reducing a generating amount of fined powders and coarse powders in the pulverizing step.

DISCLOSURE OF THE INVENTION

That is, in accordance with the present invention, there is provided a granulating apparatus of a resin composition comprising:

a cylinder body placed in an upper portion of a rotating rotor;

an opening portion for supplying a resin composition molten and mixed through the cylinder body;

a cylinder having small holes on an outer periphery of the rotor;

heating means;

the small holes on the cylinder being evenly heated passing the resin composition therethrough due to a centrifugal force so as to granulate the resin composition into powders or a fiber shape;

an outer tank recovering the granulated powder and having a wall surface of a granulated powder collision portion inclined at a degree between 10 and 80 degrees; and a cooling jacket provided on an outer periphery of the outer tank, wherein a discharge port for taking out the granulated powders is provided in a lower portion of the outer tank, and the granulated powder is transferred from the outer tank while being air cooled by an air feeding apparatus provided in front of the discharge port.

MODE FOR CARRYING OUT THE INVENTION

Figure 1:
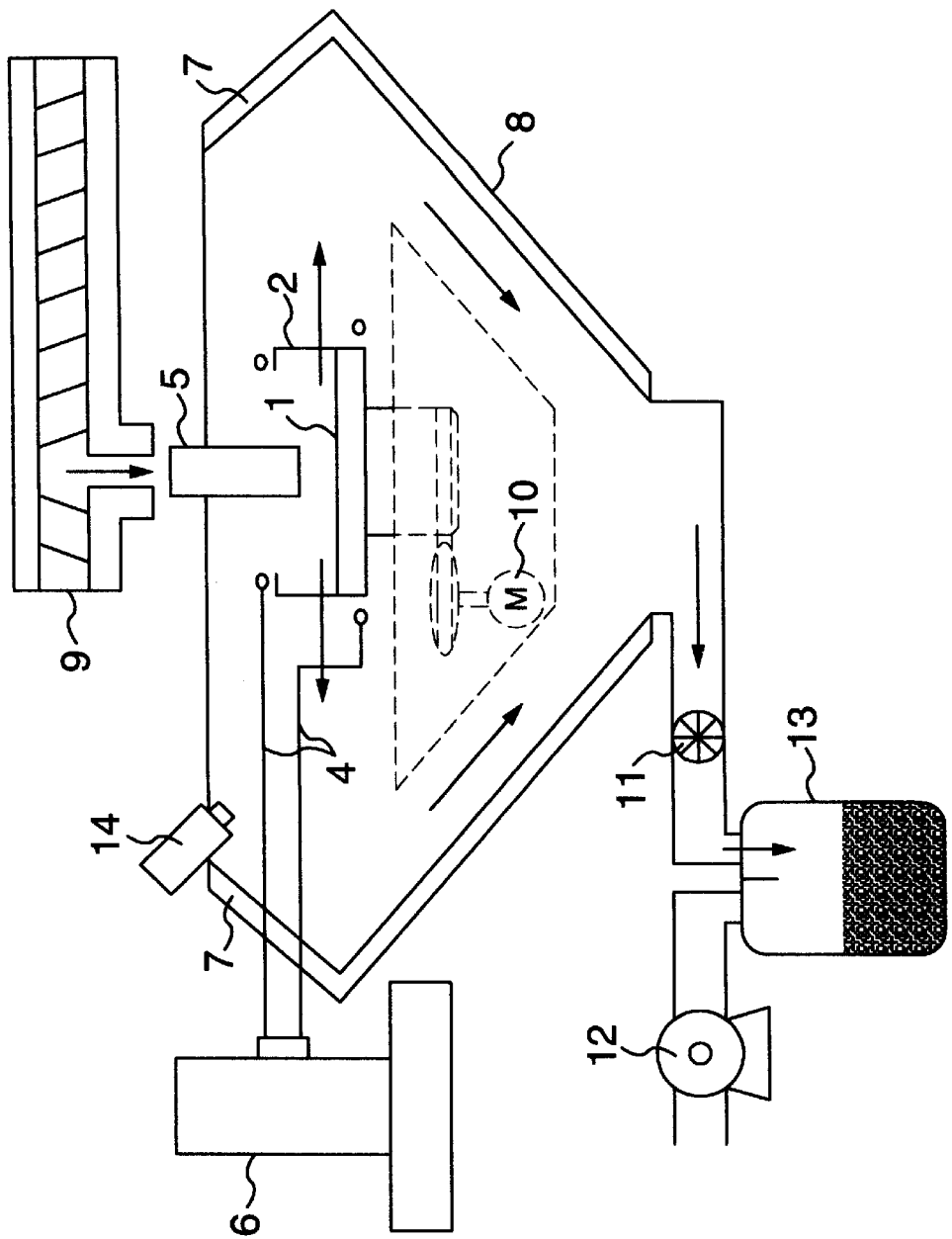
FIG. 1 is a schematic view which shows an embodiment for realizing a granulating operation of a resin composition in accordance with the present invention in a state between a melting and mixing operation of the resin and a granulated powder collection.

A molten and mixed resin composition in accordance with the present invention corresponds to a resin composition having a thermosetting resin such as an epoxy resin, an epoxy-polyester resin, a polyester resin, an acrylic-polyester resin, a polyimide resin or the like or a thermoplastic resin such as a polyvinyl chloride, a polyethylene resin, a polyamide resin, an ABS resin, a fluorocarbon resin or the like as a base resin, and containing various kinds of raw materials such as a curing agent, a filler, a pigment or the other additive mixed thereto in accordance with a usage, and the base resin may be a modified resin or a mixture in accordance with a usage.

An apparatus in accordance with the present invention is structured such that in a granulating apparatus of a resin composition which can heat a cylinder or a magnetic material contact therewith by electrically connecting an alternating current power source to a rotor provided with the cylinder and a magnetizing coil placed near the magnetic material, thereby uniformly heating the cylinder, the cylinder made of a magnetic material on an outer periphery thereof or having small holes made of a nonmagnetic material and being contact with a magnetic material, fine powders or fiber-like materials can be easily obtained by supplying the molten and mixed resin composition from an opening portion through a double-pipe type cylinder body placed in an upper portion of a rotating rotor, bringing the resin composition into contact with the heated cylinder and passing the resin composition through the small holes due to a centrifugal force without increasing a melting viscosity of the resin due to hardening.

Since an outer tank for recovering the granulated powder is formed in a double cone shape provided with a cooling jacket, an incline in an upper cone portion prevents the granulated powders from being attached and the rotor rotates on the lower cone portion, whereby the granulated powders drop down along a generated air stream, it is possible to effectively cool the granulated powders. Further, since a discharge port for taking out the granulated powders is provided in the lower cone portion of the double-cone shaped outer tank and an air feeding apparatus having a rotary blade mounted in a middle of a pipe passage provided in front thereof is connected, the transferred granulated powders are brought into contact with the rotating rotary blade while being cooled by an air, thereby being crushed into powders having a particle size close to a particle size of a final product in comparison with the powders immediately after being granulated which are output from the metal net of the rotor at a time of collecting in the product recovery container. Accordingly, since a specific surface area is increased, thereby promoting a cooling of the granulated powders, it is possible to reduce a pulverizing time and reduce fine powders and coarse powders generated at a time of a pulverizing step without deteriorating a characteristic of the resin due to attachment between the granulated powders.

Figure 2:
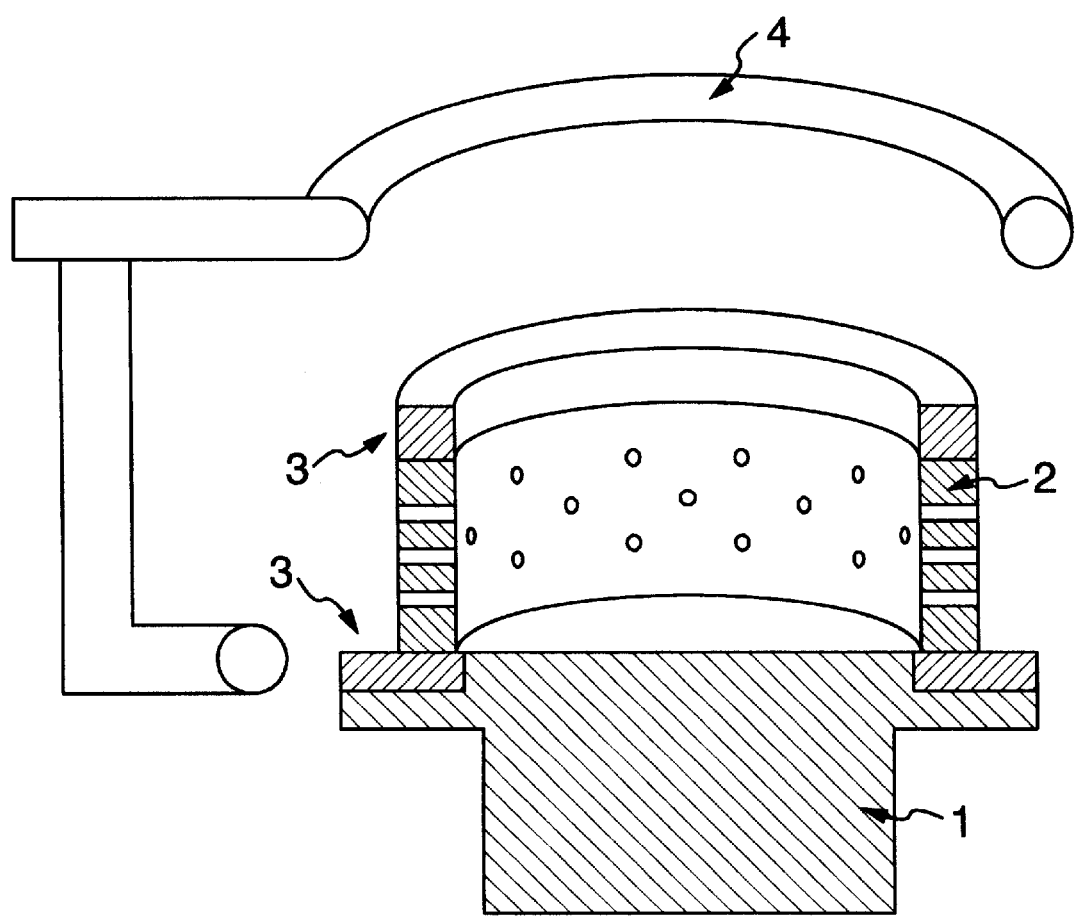
FIG. 2 is a partly cross sectional view which shows an embodiment of a rotor and a magnetizing coil used for the present invention.
Figure 3:
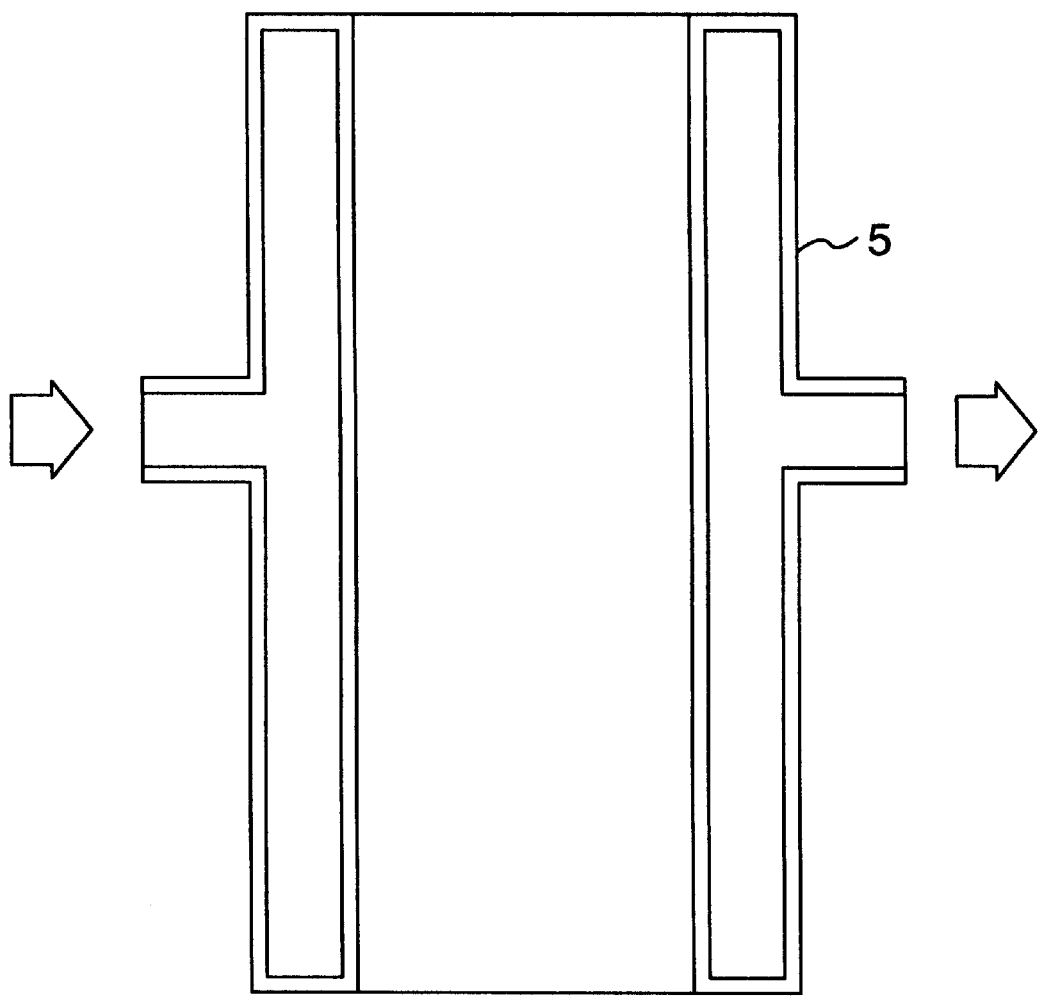
FIG. 3 is a cross sectional view which shows an embodiment of a cylinder body for introducing a molten and mixed resin composition into a rotor.

Next, a description will be given of an embodiment in accordance with the present invention with reference to the accompanying drawings. FIG. 1 is a schematic view for realizing a milling method of a resin composition in accordance with the present invention, FIG. 2 shows a rotor and a magnetizing coil and FIG. 3 shows a cylinder body placed in an upper portion of the rotor. The resin molten and mixed in a twin screw extruder 9 is supplied to a rotor 1 through a cylinder body 5 cooled by passing a refrigerant between an inner wall and an outer wall. At this time, in the case that the cylinder body 5 is not cooled, the resin is easily attached to the cylinder body and it is hard to stably supply the resin, so that this is not preferable. A material of the cylinder body is not particularly limited as far as the cylinder body can be cooled through the refrigerant, for example, an iron, an aluminum or the like can be listed up.

The rotor 1 is connected to a motor 10 and can be rotated at an optional rotational speed. A cylinder 2 placed on an outer periphery of the rotor 1, having a uniform hole diameter and made of a magnetic material is heated due to an eddy current loss and a hysteresis loss caused by a passage of an alternate magnetic flux generated by electrically supplying an alternating power source generated by an alternating power source generating apparatus 6 to a magnetizing coil 4 provided near the cylinder 2. In this case, as the magnetic material, for example, an iron material, a silicone steel or the like can be listed up, and one kind or two or more kinds of magnetic material can be combined and used.

Further, the cylinder is not limited to the magnetic material, and a nonmagnetic material can be employed. In this case, an upper portion and/or a lower portion of the cylinder may be contact with the magnetic material, or may be coated with the magnetic material.

The cylinder is heated by the heated magnetic material 3 corresponding to a heat source in accordance with a heat conduction. When the cylinder 2 is made of the nonmagnetic material having a high heat conductivity, it is possible to significantly uniformly heat. As the nonmagnetic material, for example, a copper, an aluminum or the like can be listed up, and one or two or more nonmagnetic materials can be combined and used. The resin flies and moves to the cylinder 2 heated due to the centrifugal force after being supplied to the rotor 1.

The resin being contact with the heated cylinder 2 easily passes through the holes in the cylinder 2 and is discharged without a melting viscosity being increased due to hardening. The temperature for heating can be optionally set in accordance with the characteristic of the applied resin. In the case of employing the thermosetting resin, when excessively increasing the heating temperature, there is a case that the hardening of the resin is promoted, the characteristic is deteriorated and the clogging is generated in the holes of the cylinder 2. However, in the case of a proper temperature condition, since the resin significantly quickly passes through the small holes in the cylinder 2, the contact time is short and a significantly little influence is given to the characteristic. Further, since the cylinder 2 is uniformly heated, a significantly little change of the characteristic is locally given.

The resin composition granulated in powders or in a fiber shape by passing through the holes in the cylinder 2 is collected in the outer tank 8 placed in the periphery of the rotor 1. The outer tank 8 is formed in a double cone shape, and an upper cone portion is inclined at 10 to 80 degrees, preferably at 25 to 65 degrees with respect to the collision surface in order to prevent the granulated powders from being attached to the inner wall or the granulated powders from being molten and attached to each other. In the case that the incline is too small, it is not sufficiently disperse the collision energy of the granulated powders and an attachment to the wall surface is generated. Further, in the case that the incline is too large, since a reduction rate of the flying speed of the granulated powders is small and the flying direction is directed to the wall surface of the outer tank, there is a risk that an attachment is generated at a time of next wall surface collision. Further, since the attachment is easily generated when the temperature of the collision surface with the granulated powders is increased, a cooling jacket 7 is provided in the outer periphery and it is possible to cool a whole of the outer tank.

The granulated powders collided with the upper cone drop down on the lower cone along the air stream generated by the rotation of the rotor 1 while being cooled. An air stream is generated within the outer tank 8 due to the rotation of the rotor 1, however, in order to further strengthen the air stream, one or a plurality of air stream generating apparatuses 14 can be mounted and commonly used. The air stream generating apparatus 14 is not limited as far as the apparatus can forcibly generate the air stream such as a blower, a compressed air or the like. Since the granulated powders can not be sufficiently cooled during the flying when the inner diameter of the outer tank 8 is too small, there is a risk that the granulated powders are attached to the inner wall and the granulated powders are molten and attached to each other, so that it is not preferable. The size of the outer tank 8 is dependent upon an amount of resin to be treated, and for example, in the case that a diameter of the rotor is 20 cm, it is possible to prevent the granulated powders from being attached and being molten and attached when the inner diameter is 100 cm.

A discharge port for taking out the granulated powders is provided in the lower cone portion of the double-cone shaped outer tank 8 and is connected to an air feeding apparatus 12 having a rotary blade 11 mounted in the middle of a pipe passage provided in front thereof. The transferred milled powders are brought into contact with the rotating rotary blade 11 while being air cooled, thereby being crushed into powders having a particle size closer to that of a final product than that of powders immediately after being granulated and flying out from the metal net of the rotor. Accordingly, a specific surface area is large, whereby a cooling operation is promoted, so that the granulated powders are transferred to a granulated powder recovery container 13 after being sufficiently cooled. Accordingly, since even the granulated powders which is cooled on the surface during the flying immediately after being granulated, however, still has an internal heat at a time of being collected in the outer tank 8 are transferred to the granulated powder recovery container 13 after being sufficiently cooled, it is possible to prevent the granulated powders from being attached to each other and the characteristic from being deteriorated due to a heat history.

Since the collision energy between the granulated powders and the rotary blade 11 is sufficiently smaller than a crushing energy of a normal pulverizer, no fine powders are generated by the collision with the rotary blade 11. The material and the number of vanes and the number of the rotary blade 11 are not limited as far as the rotary blade 11 generates the pulverization at a time of being brought into contact with the granulated powders. Further, a fan or a blower of the air feeding apparatus can be mounted in front of the granulated powder recovery container 13 in place of the rotary blade.

When setting an average particle diameter of the resin composition obtained after being granulated to $\alpha$, an average breadth of the collected powders or fiber-like granulated powders is adjusted to 0.5 $\alpha$ to 12.0 $\alpha$, and an average length is adjusted to 1.0 $\alpha$ to 20.0 $\alpha$. The average breadth and the average length of granulated powder are adjusted in accordance with a supply speed of a molten resin composition, a melting viscosity, a rotational speed of the rotor, a hole diameter of the cylinder, and a heating temperature. In comparison with the average breadth of the granulated powders 1.0 $\alpha$ to 20.0 $\alpha$ and the average length thereof 1.0 $\alpha$ to 40.0 $\alpha$, which is obtained in the conventional art Japanese Patent Unexamined Publication No. 11-309713, the granulated powders having the particle diameter close to the particle diameter of the product powders can be obtained, so that an effect of reducing the fined powders and the coarse powders generated in the pulverizing step is increased.

A description will be in more detail given of the present invention on the basis of an embodiment.

Embodiment 1

After blending a bisphenol A-type epoxy resin (an epoxy equivalent 850) 5 kg, a crystal silica powder 5 kg, 2-methyl imidazole 0.06 kg and a leveling agent 0.02 kg by a Henschel mixer, melting and mixing by a twin screw extruder, a molten epoxy resin composition at 120° C. is obtained.

This epoxy resin composition is supplied to a rotor provided with a copper cylinder having a hole diameter of 1.0 mm and heated to 120° C. by a magnetizing coil, having a diameter of 24 cm and rotating at 3000 r.p.m, whereby a fiber-like composition having an average breadth 90 μm and an average length 134 μm is obtained. When pulverizing the above composition by a pulverizer at 4000 r.p.m, an epoxy resin composition of an average particle diameter 50 μm including no fine powders having a particle size equal to or less than 7 μm and no coarse powders having a particle size equal to or more than 170 μm is obtained.

Embodiment 2

The same molten epoxy resin composition having a temperature of 120° C. as that of the embodiment 1 is supplied to a rotor provided with a copper cylinder having a hole diameter of 3.0 mm and heated to 120° C. by a magnetizing coil, having a diameter of 24 cm and rotating at 3000 r.p.m, whereby a fiber-like composition having an average breadth 100 μm and an average length 150 μm is obtained. When pulverizing the above composition by a pulverizer at 4000 r.p.m., an epoxy resin composition of an average particle diameter 60 μm including no fine powders having a particle size equal to or less than 10 μm and no coarse powders having a particle size equal to or more than 180 μm is obtained.

Comparative Embodiment

After a bisphenol A-type epoxy resin (an epoxy equivalent 850) 5 kg, a crystal silica powder 5 kg, 2-methyl imidazole 0.06 kg and a leveling agent 0.02 kg is blended by a Henschel mixer, the epoxy resin is molten and mixed by a twin screw extruder. After cooling by a cooling belt, roughly pulverizing by a hammer mill, a coarse pulverized material having an average particle diameter 800 μm and a particle size distribution 40 μm to 10 mm is obtained. When pulverizing the above pulverized material by a pulverizer at 4000 r.p.m., an epoxy resin composition of an average particle diameter 70 μm including 11 wt % of fine powders having a particle size equal to or less than 10 μm and 8% of coarse powders having a particle size equal to or more than 180 μm is obtained.

INDUSTRIAL UTILIZATION POSSIBILITY

In accordance with the granulating apparatus of the resin composition of the present invention, since it is possible to stably obtain the granulated fine powders having the small particle diameter close to the target particle diameter of the product and having the narrow particle size distribution, it is possible to reduce the pulverizing time, it is possible to reduce the generation of the fine powders and the coarse powders in the pulverizing step and it is possible to improve a productivity together with the omission and reduction of the classifying step or the saving of labor and time and improve an operation environment. Accordingly, it is possible to connect the granulating apparatus to a desired granulated powder processing apparatus so as to intend to obtain an automation and it is possible to completely seal the granulating apparatus so as to prevent the powders and dusts from giving a bad influence to a human body and an environment.

What is claimed is:

1. A granulating apparatus of a resin composition comprising:

a cylinder body placed in an upper portion of a rotating rotor;

an opening portion for supplying a resin composition molten and mixed through the cylinder body;

a cylinder having small holes on an outer periphery of the rotor;

heating means;

the small holes on the cylinder being evenly heated passing the resin composition therethrough due to a centrifugal force so as to granulate the resin composition into fined powders or a fiber shape;

an outer tank recovering the granulated resin and having a wall surface of a granulated powder collision portion inclined at a degree between 10 and 80 degrees; and a cooling jacket provided on an outer periphery of the outer tank, wherein a discharge port for taking out the granulated powders is provided in a lower portion of the outer tank, and the granulated powder is transferred from the outer tank while being air cooled by an air feeding apparatus provided in front of the discharge port.

2. A granulating apparatus of a resin composition as claimed in claim 1, wherein the outer tank for recovering the granulated powder is formed in double cone shape, and the granulated powders drop down on a lower cone portion provided with a cooling jacket in an outer periphery thereof along an air stream generated by a rotation of the rotor after the granulated powders are brought into contact with an upper cone portion provided with a cooling jacket in an outer periphery thereof, whereby the granulated powders can be cooled.

3. A granulating apparatus of a resin composition as claimed in claim 2, wherein a discharge port provided in a lower portion of the outer tank is connected to an air feeding apparatus having a rotary blade mounted in a pipe passage.

4. A granulating apparatus of a resin composition as claimed in claim 1, wherein a discharge port provided in a lower portion of the outer tank is connected to an air feeding apparatus having a rotary blade mounted in a pipe passage.

* * * * *